(12) United States Patent
Aher et al.

(10) Patent No.: US 12,225,260 B2
(45) Date of Patent: Feb. 11, 2025

(54) SYSTEMS AND METHODS FOR DYNAMICALLY NAVIGATING CONTENT

(71) Applicant: Adeia Guides Inc., San Jose, CA (US)

(72) Inventors: Ankur Anil Aher, Maharashtra (IN); Charishma Chundi, Andhra Pradesh (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/571,226

(22) Filed: Jan. 7, 2022

(65) Prior Publication Data

US 2022/0132201 A1 Apr. 28, 2022

Related U.S. Application Data

(63) Continuation of application No. 17/072,908, filed on Oct. 16, 2020, now Pat. No. 11,252,467.

(51) Int. Cl.
| | |
|---|---|
| *G06F 3/04812* | (2022.01) |
| *G06F 3/04817* | (2022.01) |
| *G06F 3/04847* | (2022.01) |
| *H04N 21/431* | (2011.01) |
| *H04N 21/6587* | (2011.01) |

(52) U.S. Cl.
CPC ..... *H04N 21/4312* (2013.01); *G06F 3/04812* (2013.01); *G06F 3/04817* (2013.01); *G06F 3/04847* (2013.01); *H04N 21/6587* (2013.01)

(58) Field of Classification Search
CPC ............ H04N 21/4312; H04N 21/6587; G06F 3/04812; G06F 3/04817; G06F 3/04847; G06F 3/0484; G06F 3/0488; G06F 3/0485

See application file for complete search history.

(56) References Cited

U.S. PATENT DOCUMENTS

| | | | |
|---|---|---|---|
| 9,575,642 B1 * | 2/2017 | Minkin | ................ G06F 16/438 |
| 2002/0063737 A1 * | 5/2002 | Feig | .................... G06F 3/04847 |
| | | | 715/786 |
| 2011/0145745 A1 | 6/2011 | Hyeon et al. | |
| 2014/0258854 A1 * | 9/2014 | Li | ......................... H04N 21/414 |
| | | | 715/702 |
| 2016/0291860 A1 * | 10/2016 | Higuchi | ........... H04N 21/47217 |
| 2017/0285861 A1 * | 10/2017 | Siddiq | ................... G06F 3/0418 |

OTHER PUBLICATIONS

International Search Report and Written Opinion of PCT/US2020/067205 dated Jul. 1, 2021.

* cited by examiner

*Primary Examiner* — Jeanette J Parker
(74) *Attorney, Agent, or Firm* — Haley Guiliano LLP

(57) ABSTRACT

Methods and systems for dynamically navigating content are provided. An input to perform content navigation may be detected; in response, several selectable navigation settings are displayed, each navigation setting being associated with a navigation interval. An input indicating a selection of a navigation setting may be received and an input about a navigation amount may be received. Based on the navigation amount, navigation within the navigation interval is performed.

18 Claims, 13 Drawing Sheets

SYSTEMS AND METHODS FOR DYNAMICALLY NAVIGATING CONTENT

CROSS-REFERENCE TO RELATED APPLICATIONS

This application is a continuation of U.S. patent application Ser. No. 17/072,908, filed Oct. 16, 2020, the disclosure of which is hereby incorporated by reference herein in its entirety.

BACKGROUND

The present disclosure relates to media play systems and methods and, more particularly, to systems and methods related to media play operations, such as shifting a current play position in content (e.g., a media asset) that is being viewed.

SUMMARY

Audio and video media devices, such as dedicated recorders, televisions, and more recently handheld devices (e.g., smartphones and tablets) offer their users the flexibility to perform various media content manipulations, offline (disconnected from Internet access) or online (while connected to the Internet, wirelessly or with wire). Benefiting from modern day technology advancements, media device users enjoy flexible media content (e.g., videos and audio books) consumption at, and during, a time of their choosing, at a location of their choosing, and with a media device of their choosing.

Media devices are ubiquitous, available on a variety of platforms and implemented on and compatible with a variety of networks and electronic devices. Continuously growing in application, it is no surprise that each media device type features a distinct user experience. For example, a smart television or a digital recorder, in combination with a large screen display, offers the consumer no less than a theater-like viewing experience, yet a smart handheld device offers the consumer the convenience of mobility. Where an audio player may not have or need graphics features, a video player typically does. Where a large form factor media player, such as a desktop computer, may be void of touchscreen media content functionality, a small form factor media player, such as a smartphone, is nearly expected to have a touchscreen feature.

Media content functionality, like a touchscreen seekbar for media content skip operations, are among more recent electronic entertainment device improvements offering the consumer flexibility and convenience to rapidly navigate media content with a simple touch of the finger. Accordingly, different media device types offer a different user experience, flexibility and convenience.

A conventional seekbar, for example, enables a user to navigate through a video/audio in a forward or backwards direction. The seekbar length is not proportional to the length of audio/video. Instead, the seekbar's length is the same for all video/audio content. It is relatively easy to use the seekbar for audio/video content with small duration when compared to the ones with a long duration. This is particularly the case in small screen devices for content with a long duration. A user typically has to be very careful, otherwise there may be excessive back and forth fine horizontal adjustment needed to navigate to the user's preferred time point in the content. Sometimes such excessively fine, repetitive adjustment can lead to ergonomic problems like a pain in the wrist, etc. In other situations, a user may be holding a device in one hand and may have difficulty using that hand to navigate to the desired location on the seekbar. Thus, there is a need for improved media navigation tools for navigating to a desired play position and that is adapted to smaller display devices.

In some approaches described herein, a content navigation system creates different navigation intervals within a content to assist the user in more accurately navigating from a play position to a shifted play position. In some embodiments, a navigation interval represents a portion only of the content in which navigation is permitted, that is to say, the shifted play position can only be within that portion. For example, the content navigation system may detect an input from a user (e.g., using a touchscreen) for activating a media content navigation operation (e.g., selecting a seekbar tool). In response to that input, the content navigation system generates for display on an interface (e.g., a screen of a smartphone, tablet or laptop) at least two selectable navigation settings that can be selected by the user. Each setting is associated with a shifting limit value, the purpose of which is to define, with a current play position of the content, a navigation interval within the content. The navigation interval represents a portion of the content that is navigable during the media content navigation operation and the rest of the content will be excluded from that navigation operation. The shifting limit value can thus be chosen to be different from a beginning or an end of the content. The two navigation settings each have a different shifting limit value, such that two different navigation intervals within the content are determined. For instance, one of the navigation settings is associated with a shifting limit value of 5 min for fine control and the other navigation setting with a shifting limit value of 1 h for coarser control. The two settings offer two different options to provide an improved control over the content navigation operation. The content navigation system then receives an input, from the user, indicating a selection of one of the two navigation settings. The user thus has the choice of being able to navigate only in the next (or previous) 5 min or 1 h. To determine by how much the content is to be shifted, the content navigation system can be arranged to receive an input that represents a navigation amount (e.g., a physical 2-dimensional path within the display interface or a physical 1-dimensional projection thereof, wherein the path typically represents a movement of a finger or a pointer on the display interface). The content navigation system finally navigates from a current position to a shifted position, using the navigation amount, wherein the shifted position is within the navigation interval of the selected navigation setting.

In some approaches described herein, the navigation internal is determined based on the current play position and the shifting limit value. In some embodiments, the boundaries of the navigation interval may be defined by a current play position (e.g., the play position when the content navigation system detects the input to perform the content navigation operation or when the content navigation system receives an input indicating a selection of the navigation settings or the navigation amount) and the current play position plus the shifting limit value, or the current play position minus the shifting limit value and the current play position plus the shifting limit value, or even the current play position minus the shifting limit value and the current play position. Therefore, the content navigation system provides an improved method to shift content in fast forward, fast backward, or both. In some embodiments, a forward shifting limit value and a backward shifting value may be used, so that the amount of content navigable forward is different from the amount of content navigable in reverse. The content navigation system can therefore adapt to the current play position in the content and/or the needs of the user and the device being used.

In some approaches, the time shifting value may be determined in various way. In an embodiment, the shifting limit value is determined taking into account the overall length of the content or the length of content left to watch or elapsed (so-called relative shifting limit value). In another embodiment the shifting limit value is an absolute value which is independent of the overall length of the content (so-called absolute shifting limit value). The relative shifting value may be defined as any amount of time between a current play position and the end of the content or any amount of time of the overall length of the content (i.e. any amount of time of the content left to watch). For instance, the content navigation system may determine the shifting limit value to be a small percentage (e.g., 5%) of the amount left to watch for a first navigation setting and a larger percentage (e.g., 50%) of the amount left to watch for a second navigation setting. The first navigation setting enables the viewer to navigate up to 5% of the content left to watch, while the second navigation setting enables the viewer to navigate up to 50% of the content left to watch. For instance, the absolute shifting limit value may be 1 min or 1 h. At least one of the shifting limit values may be relative while at least one of the shifting limit values may be absolute (for instance, 1 min, 1 h and 80%).

In some approaches described herein, the content navigation system also takes into account a scaling parameter to control the relationship between the navigation amount and the amount of content that is being shifted in the navigation interval. In particular, the content navigation system obtains a scaling parameter (e.g., an input from the user), and that scaling parameter is used to translate the navigation amount to a navigation amount time within the navigation interval (e.g., to equate the path to a time by which the play position is to be shifted). In an implementation, each selectable navigation setting is associated with a scaling parameter, and receiving the input indicating the selection of the navigation setting causes the scaling parameter to be utilized. The content navigation system may also determine scaling parameters such that the longer the navigation interval, the higher the scaling parameter. This enables similar navigation amounts (e.g., a 3-cm movement of the finger) to shift a small amount of content when the navigation interval is small and to shift a larger amount of content when the navigation interval is large (for a same user device). For instance, if a user selects the navigation setting associated with the shifting limit value of 5 min, the scaling parameter is chosen such that a navigation amount corresponding to a path length of a few centimeters navigates the content by a navigation amount time of a few minutes. Conversely, if a user selects the navigation setting associated with the shifting limit value of 1 h, the scaling parameter is chosen such that a same navigation amount (i.e. corresponding to the path length of a few centimeters, on a same user device) navigates the content by a navigation amount time of a few tens of minutes. The user is thus able to easily and precisely reach the desired shifted play position.

Other approaches and embodiments are disclosed herein. Media content manipulation mechanisms, techniques and systems are introduced to facilitate convenient, rapid and precise navigation of media content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In an aspect of the disclosure, systems and methods implement an interface for content navigation. The interface is configured to detect activation of a navigation process using the interface, display a plurality of navigation settings associated with navigation intervals within the content, detect selection of one navigation setting, detect an input relating to a navigation amount, and navigate within the selected navigation interval based on the navigation amount.

Figure 1:
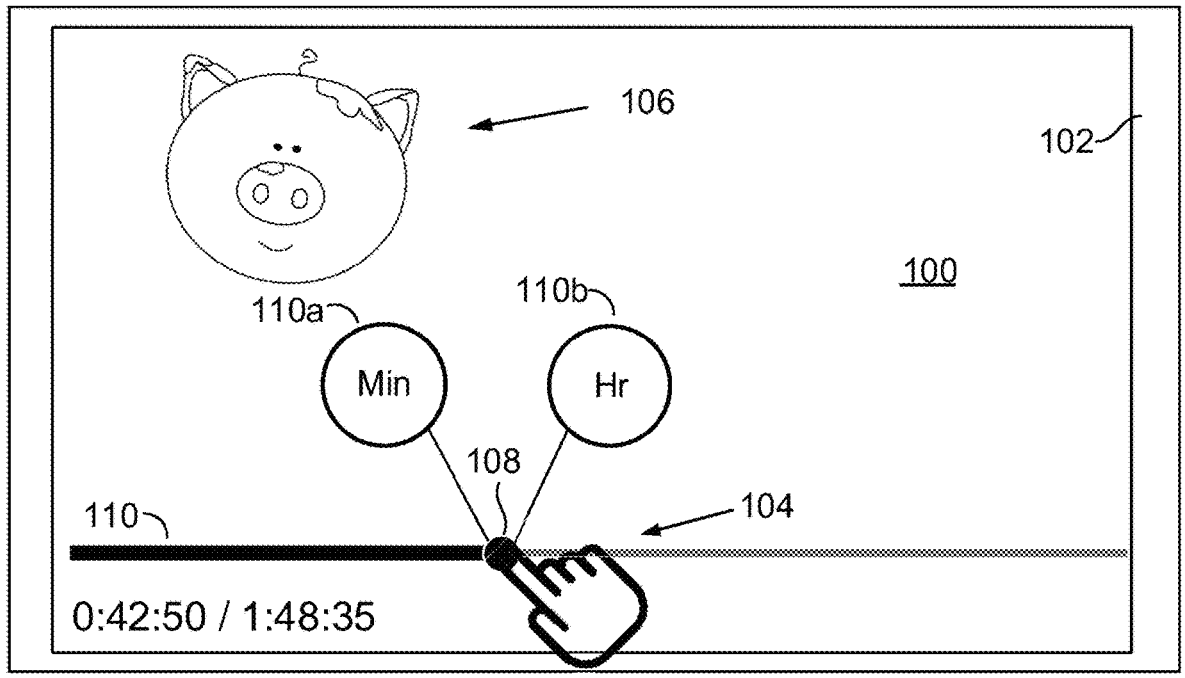
FIG. 1 is an illustrative diagram of a graphical interface for navigating content, according to some embodiments of the disclosure.
Figure 2:
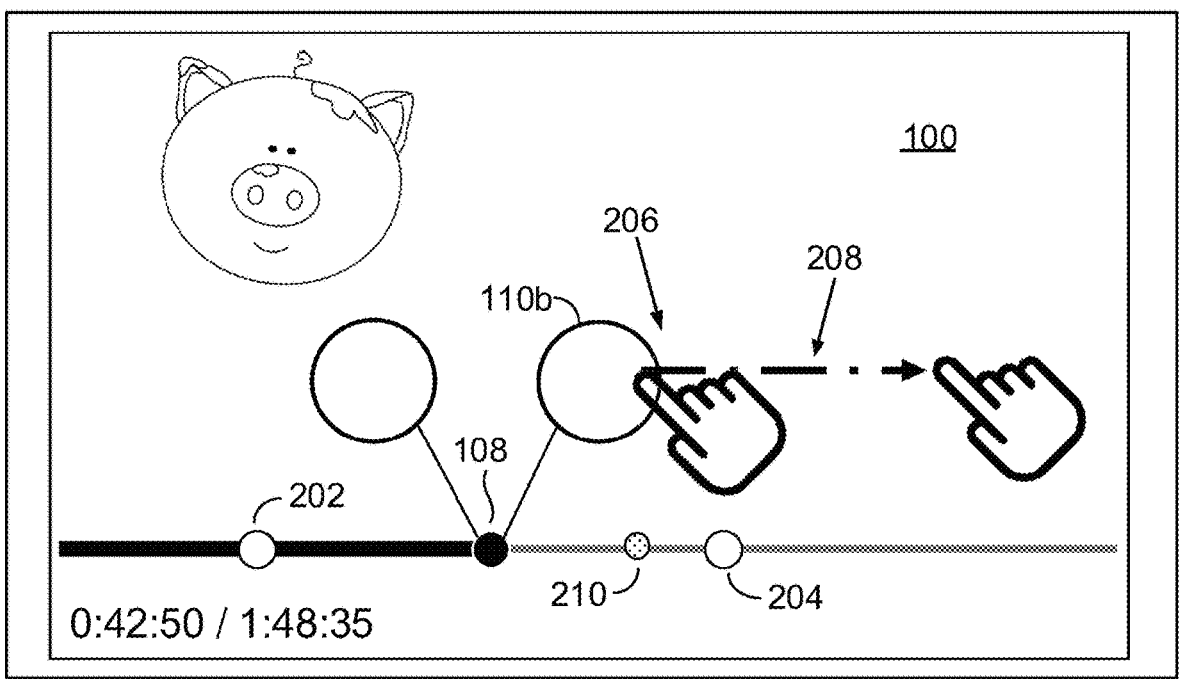
FIG. 2 is another illustrative diagram of a graphical interface for navigating content, according to some embodiments of the disclosure.

FIGS. 1 and 2 are illustrations of a graphical user interface for navigating content based on a navigation interval, according to some embodiments of the disclosure. A content navigation system may detect, in a content display interface 100 of a user device 102 (smartphone, tablet, etc.), an input 104 to perform a content navigation operation in a media content 106 that is being viewed by a user. For instance, the input 104 may be the user clicking or tapping, using the content display interface 100, on a current play position 108 on a seekbar 110 associated with the content 106.

In response to that detection, the content navigation system generates for display, on the content display interface 100, a plurality of selectable navigation settings 110a, 110b. For instance, the display of the navigation settings 110a, 110b may appear overlaid on the content being displayed (e.g., with transparency or not). Each selectable navigation setting 110a, 110b may comprise a visual representation to assist the user in differentiating between them, such as an alphanumerical character ("−", "+", "S", "M" or "Min", "H" or "Hr", etc.). Each navigation setting is associated with a shifting limit value that determines a navigation interval within the content. A navigation interval represents a portion of the content in which the content navigation system will allow the user to navigate. The portion of the content that is outside the navigation interval is therefore not accessible to the user via the processes disclosed herein. In this respect, the time shifting limits are set so that at least one (and preferably all) of the navigation intervals of the navigation settings does not encompass the beginning or the end of the content. The navigation interval is defined by the shifting limit value and a current play position of the content. In addition, the shifting limit values of the plurality of navigation settings 110a, 110b are set to be different from one another, such that the corresponding navigation intervals are different. A navigation interval is illustrated by means of its boundaries 202, 204 in FIG. 2 and will be discussed in more detail below. Typically, one of the shifting limit values is a few minutes or less, so that the navigation interval spans to a few minutes after (and/or before) the current play position 204 (e.g., 1 min or 5 min) and one of the shifting limit values is a few tens of minutes or more, so that the navigation interval spans a few tens of minutes after (and/or before) the current play position (e.g., 30 min or 60 min). The user is thus given, by the content navigation system, a plurality of options that allow him or her to adapt the navigation process to his or her need, with no risk to navigate to an unwanted portion of the content.

As illustrated in FIG. 2, the content navigation system then receives an input 206, from the user, which indicates a selection of one of the selectable navigation settings 110a, 110b (e.g., navigation setting 110b). For instance, the input 206 may be the user clicking or tapping on one of the selectable navigation settings 110a, 110b, which are displayed on the content display interface 100. As mentioned above, FIG. 2 illustrates the navigation interval, by means of its boundaries 202, 204 (represented by visual markers at its boundaries on the seekbar), associated with the navigation setting 110b. Typically, to assist the user in making his or her choice, the navigation interval may be represented on the content display interface after reception of the input 206 (in that case only the navigation interval of the selected navigation setting is represented) or after reception of the input 104 (in that case the navigation intervals of all the selectable navigation settings are represented). After reception of the input 206, the non-selected navigation setting(s) may no-longer be displayed or they might remain on the content display interface in case the user changes his or her mind, or all the navigation settings may no longer be displayed.

The content navigation system further receives an input 208 relative to the navigation amount within the content display interface 100. For instance, the input 208 may be the user dragging his or her finger on the content display interface 100 from one place to another, thereby defining a physical path (e.g., physically touching the content display interface, moving or sliding the finger while keeping contact, and releasing the finger from the content display interface). The navigation amount may be the length of that path, which may be 2-dimensional, or the length of a 1-dimensional projection of that path, such as a projection orthogonal or parallel to the seekbar. Visual markers, discussed in more detail below, may be provided to assist the user in determining how much navigation amount is desired.

Finally, the content navigation system navigates from the current play position 108 to a shifted play position 210 based on the navigation amount. A scaling parameter may be used to convert the navigation amount into a navigation amount time, the navigation amount time being the amount of content between the current play position 108 and the shifted play position 210. Per the navigation setting and its associated shifting limit value, the shifted play position can only be in the navigation interval (shifted play position 210 is between the boundaries 202, 204 of the navigation interval).

Figure 3:
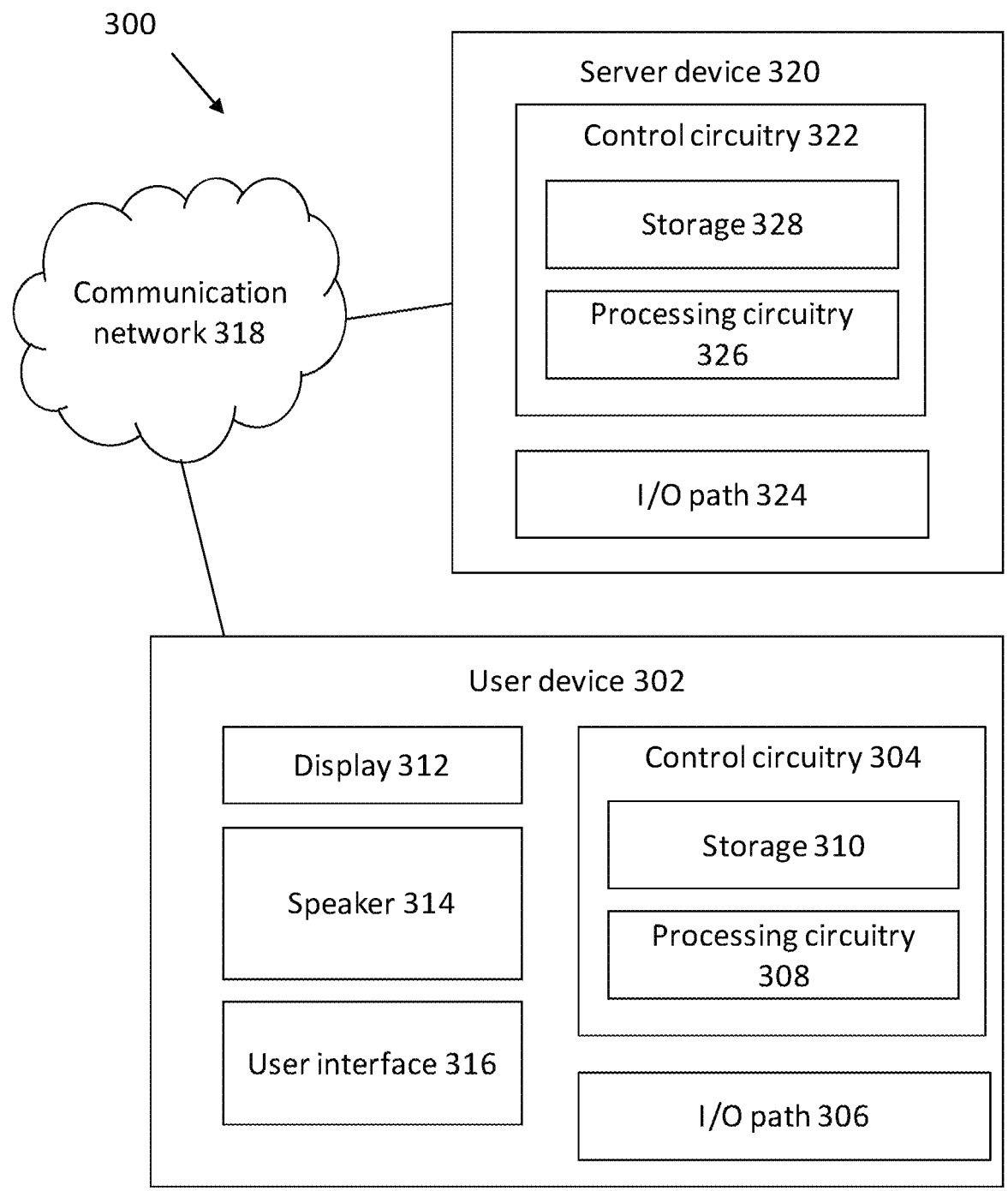
FIG. 3 is an illustrative topology of equipment (or computing configuration) programmed and configured for navigating content, according to some embodiments of the disclosure.

FIG. 3 shows an illustrative block diagram of a computing configuration 300 that may include the content navigation system disclosed in relation to FIGS. 1 and 2. Computing configuration 300 includes a user device 302. In some embodiments, the user device 302 may include control circuitry 304 and an input/output (I/O) path 306. Control circuitry 304 may include processing circuitry 308, and storage 310 (e.g., RAM, ROM, hard disk, removable disk, etc.). I/O path 306 may provide device information, or other data, over a local area network (LAN) or wide area network (WAN), and/or other content and data to control circuitry 304. Control circuitry 304 may be used to send and receive commands, requests, signals (digital and analog), and other suitable data using I/O path 306. I/O path 306 may connect control circuitry 304 (and specifically processing circuitry 308) to one or more communications paths.

User device 302 may include a display 312 and a speaker 314 to display content visually and audibly. In addition, to interact to a user, user device 302 includes a user interface 316 (which may be used in relation to the content display interface 100 disclosed herein). The user interface 316 may include a touchscreen, mouse and/or keyboard. The user interface 316 is connected to the I/O path 306 and the control circuitry 304. In an embodiment, the user interface 316 and the display 312 may be a touchscreen enabling the user to provide input(s) to the user device. The display 312 may a screen (such as a monitor or a TV).

Control circuitry 304 may be based on any suitable processing circuitry such as processing circuitry 308. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as storage 310, which is part of control circuitry 304. Storage 310 may store instructions that, when executed by processing circuitry 308, perform the processes described herein. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The user device 302 may be a smartphone, a tablet, an e-reader, a laptop, a smart TV, etc.

Computing configuration 300 may also include a communication network 318 and a server device 320. The user device 302 may be coupled to the communication network 318 to communicate with the server device 320. The communication network 318 may be one or more networks including the Internet, a mobile phone network, mobile voice or data network (e.g., a 5G, 4G or LTE network), mesh network, peer-to-peer network, cable network, or other types of communication network or combinations of communication networks.

In some embodiments, server device 320 may include control circuitry 322 and an input/output (I/O) path 324. Control circuitry 304 may include processing circuitry 326, and storage 328, which may similar to those already discussed in relation to the user device 302. Server device 320 may be a content provider for the user device 302, such as a streaming, VOD, replay platform, etc.

In some embodiments, the content navigation system comprises the user device 302, whether the content is being streamed from the server or being retrieved from the storage 310. Alternatively, the content navigation system is distributed over the user device 302 and the server device 320.

Figure 4:
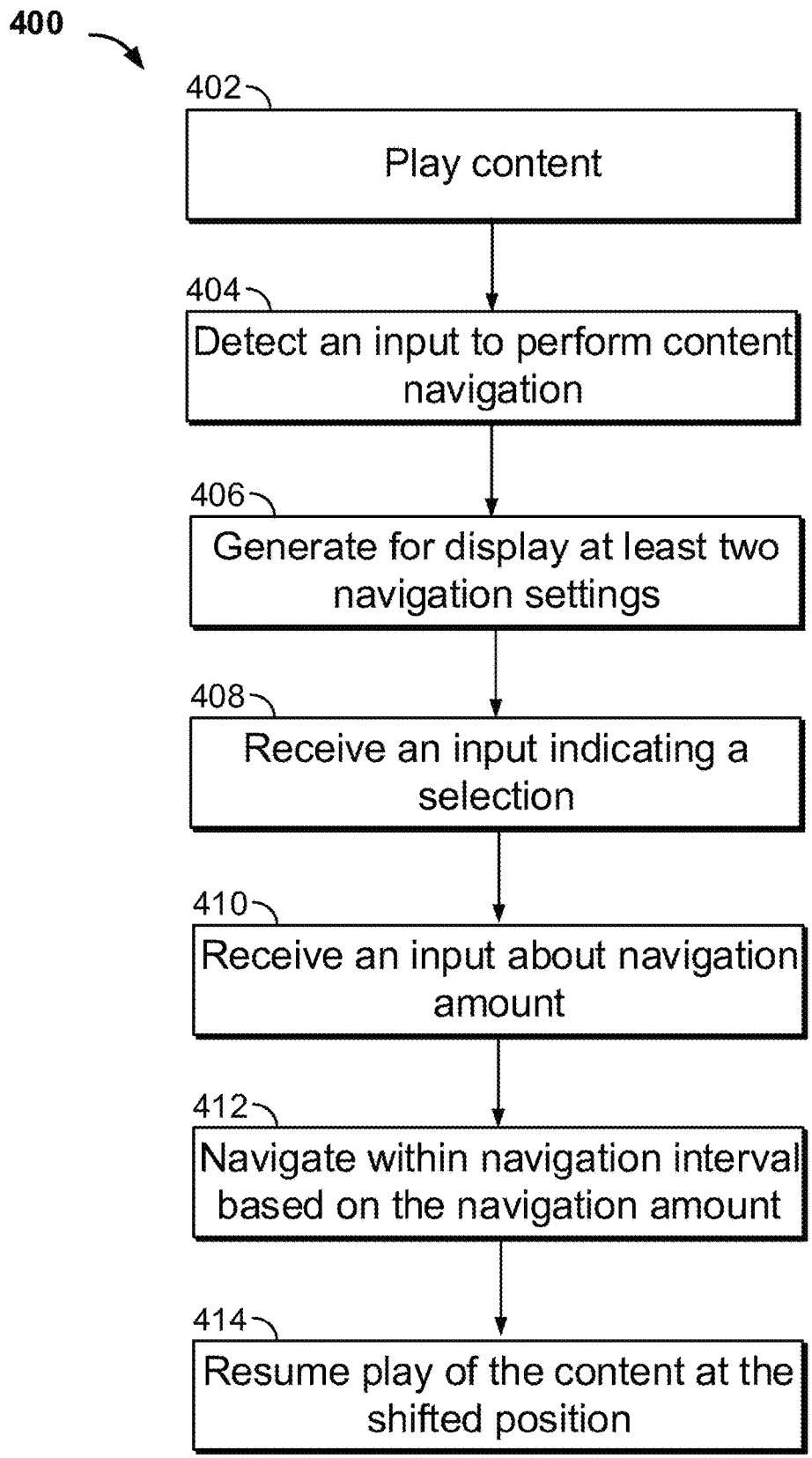
FIG. 4 is an illustrative flowchart of a process for navigating content, according to some embodiments of the disclosure.

FIG. 4 is an illustrative flowchart of a process for navigating content, in accordance with some embodiments of the disclosure. Process 400, and any of the following processes, may be executed by any of control circuitry 304 or 322 or any combination thereof, using the communication network 318. For conciseness reasons, only control circuitry 304 will be used in the following description.

At step 402, control circuitry 304 starts playing content (e.g., a media asset such as a video) on display 312.

At step 404, during play of the content, control circuitry 304 detects, via a content display interface, an input to perform a content navigation operation. This corresponds to a user wanting to navigate through the content, either forward or backward. Detecting the input to perform a content navigation operation may comprise receiving an input of a selection of a seekbar within the content display interface, the seekbar representing a navigation space throughout the content (from a beginning to an end of the content). For instance, the user might use his or her finger to tap on the seekbar (e.g., on the current play position of the seekbar). Detecting the input to perform a content navigation operation may comprise receiving an input of a user touching the display (e.g., with his or her finger), which may, for instance, cause the seekbar to be displayed. Alternatively, there might be a dedicated navigation button available on the content display interface. In an embodiment, control circuitry 304 pauses the content upon detection of the input at step 404. In an embodiment, control circuitry 304 keeps on playing the content on display 312.

At 406, control circuitry 304, in response to step 404, generates for display on the content display interface at least two navigation settings. The two navigation settings may be overlaid on the content, by the display 312. Those navigation settings are selectable using the content display interface, which means that a user is able to pick one of them. Each navigation setting is associated with a shifting limit value which determines, in combination with a current play position, a navigation interval within the content. As indicated above, no two shifting limit values are identical. This allows the content navigation system to provide flexibility to the user. Control circuitry 304 may also generate for display the seekbar at 406, if not already displayed.

At 408, control circuitry 304 receives an input indicating a selection of one of the selectable navigation settings. For instance, the user might use his or her finger to tap on one of the displayed navigation settings by means of the user interface 316 to interact with the content display interface that appears on display 312. Upon reception of the input at 408, control circuitry 304 may retrieve the shifting limit value associated with the navigation setting. In addition, upon reception at 408, control circuitry 304 may generate a request to stop displaying the navigation settings, to clear the content display interface.

At 410, control circuitry 304 receives an input indicating a navigation amount within the content display interface. The navigation amount represents how much the user wants to navigate. The navigation amount may be determined using a path on the content display interface, such as a finger being dragged while in contact. Further detail about the paths will be given below.

At 412, control circuitry 304, based on the navigation amount previously input at step 408, navigates from the current play position to a shifted play position. The shifted play position is located within the navigation interval that was retrieved from the selected navigation setting. At 414, control circuitry 304 starts playing of the content from the shifted play position.

In an embodiment, the navigation interval is based on the current play position and the shifting limit value. The current play position may be the play position at the time of the input to perform the content navigation operation (step 404), or at the time of generating for display the selectable navigation settings (step 406), or at the time of input indicating a selection of the navigable settings (step 408), or even at the time of input pertaining to the navigation amount (412). This depends on whether the content was paused or not at step 404, 406, 408, 410 or 412. In practice, it would take only a few seconds from step 402 to step 410 such that which current play position is used has no significant impact. In one embodiment, the navigation interval may be dynamically computed such that any change in the current play position impacts the navigation interval.

Figure 5A:
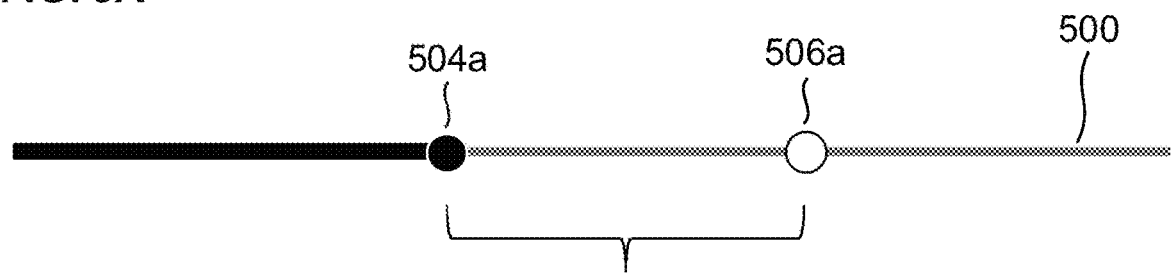
FIGS. 5A, 5B, 5C, and 5D are illustrative diagrams of the boundaries of the navigation intervals, according to some embodiments of the disclosure.
Figure 5B:
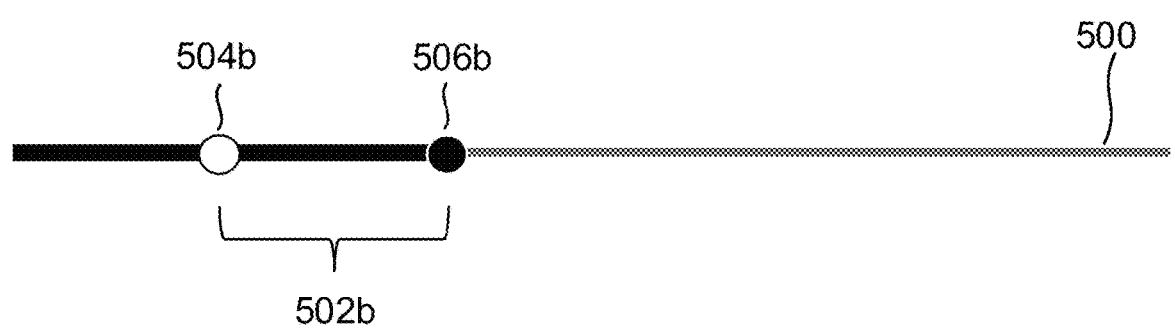
Figure 5C:
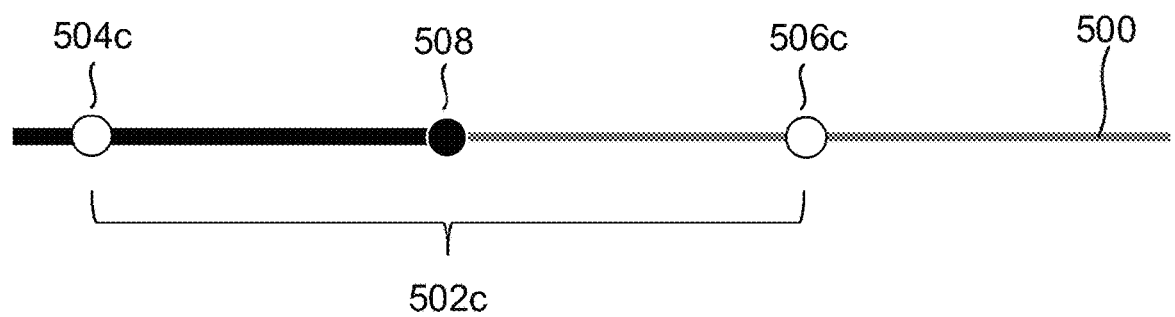
Figure 5D:
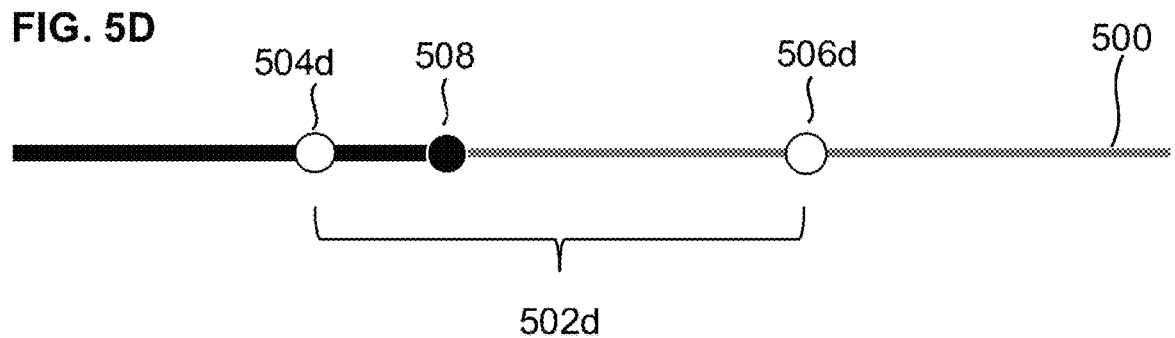
Figure 6A:
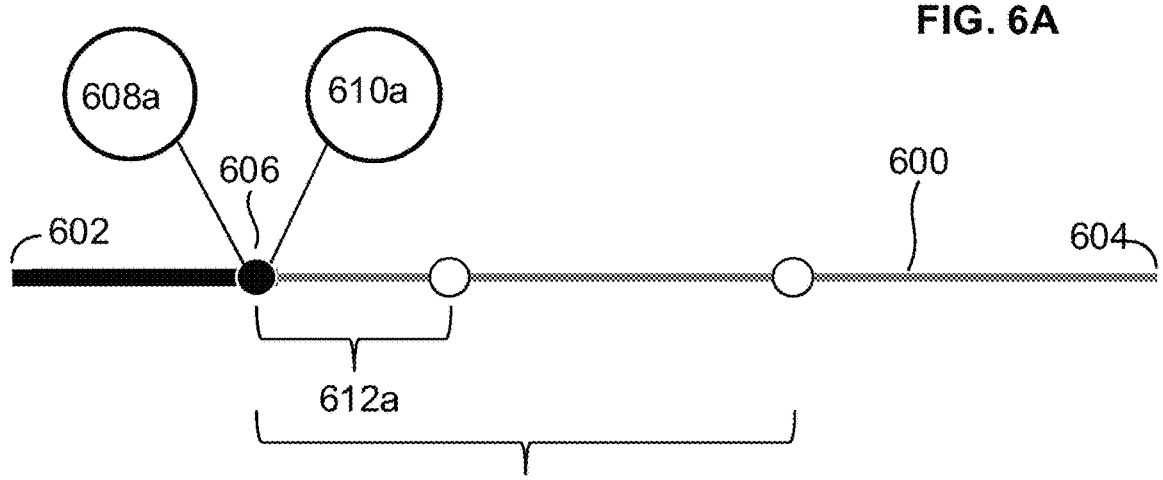
FIGS. 6A, 6B, and 6C are illustrative diagrams of the navigation intervals and the shifting limit values, according to some embodiments of the disclosure.
Figure 6B:
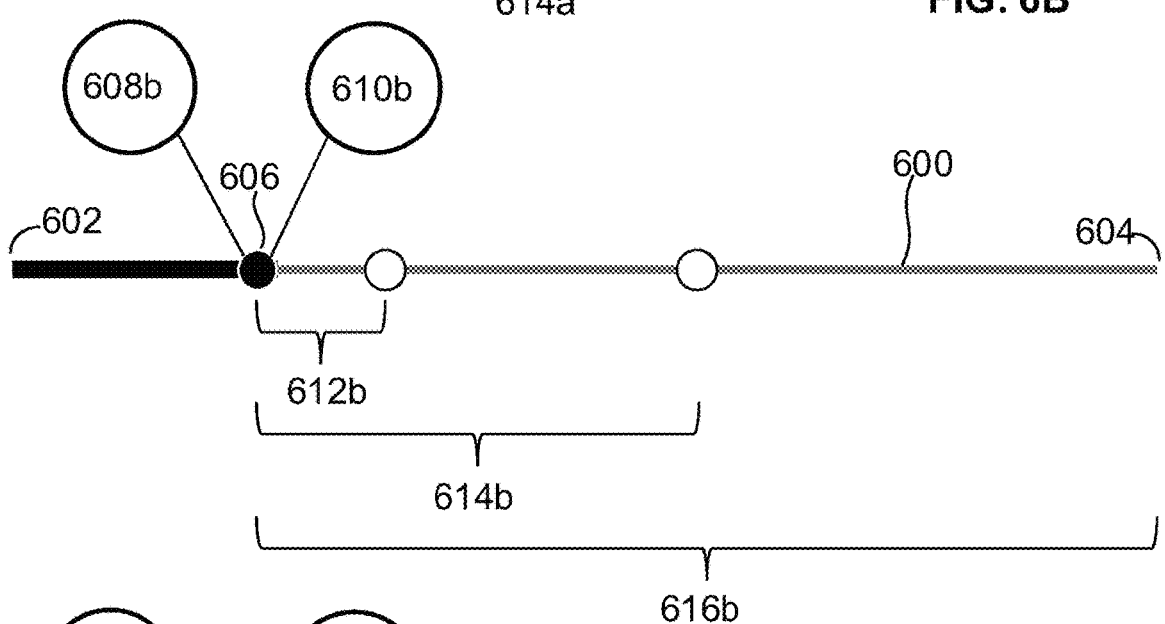
Figure 6C:
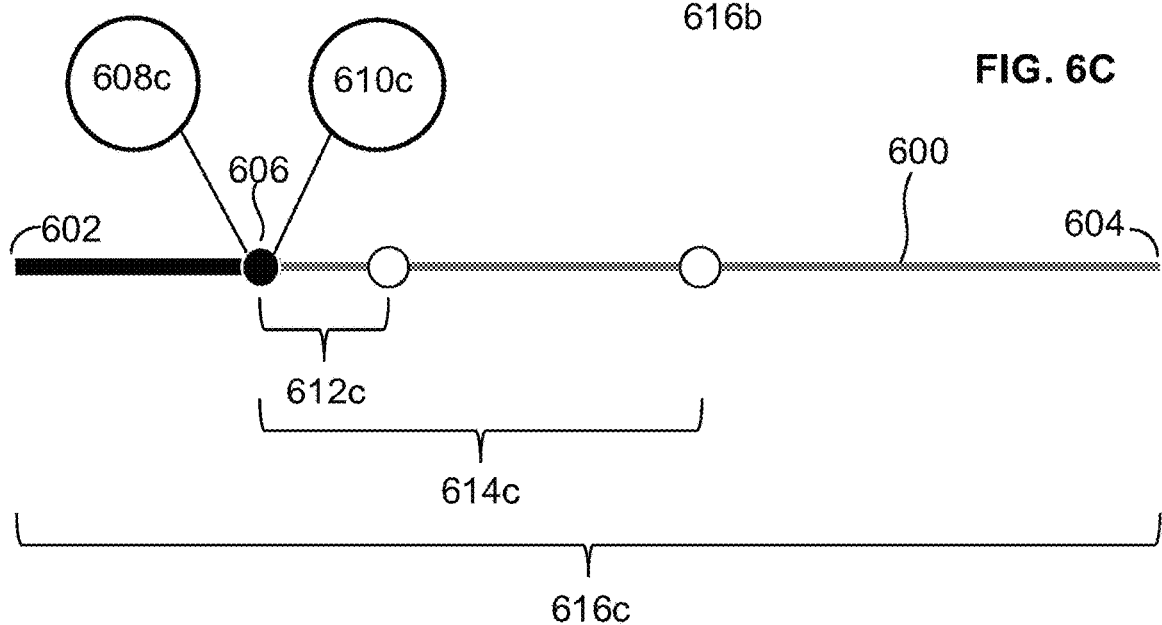
Figure 7:
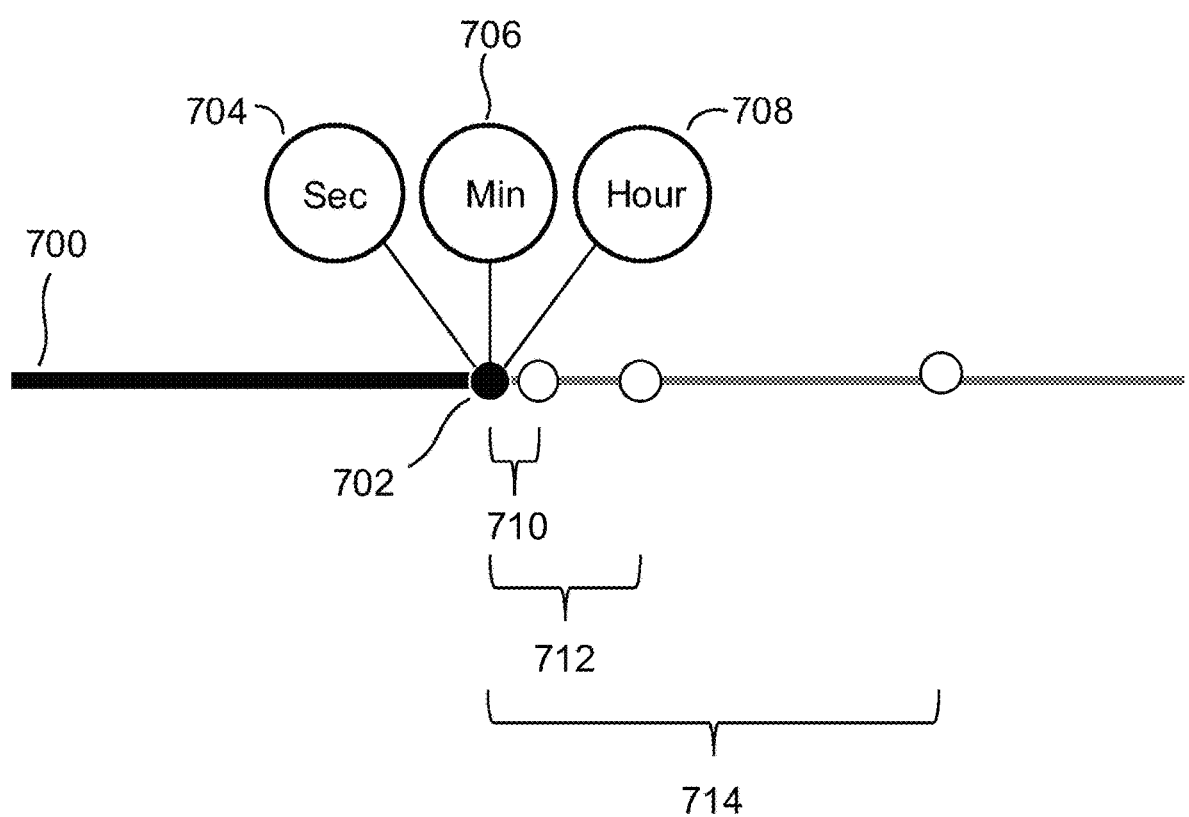
FIG. 7 is an illustrative diagram of a plurality of navigation settings, according to some embodiments of the disclosure.

FIGS. 5A, 5B, 5C, 6A, 6B, 6C, 6D, and 7 illustrate different embodiments to determine boundaries of the navigation intervals and how the navigation intervals may be computed. FIG. 7 shows a flowchart for a process to determine the navigation intervals.

FIGS. 5A, 5B, 5C and 5D illustrate, using a seekbar 500, different configurations for the boundaries of the navigation interval. In an implementation illustrated in FIG. 5A, the navigation interval 502*a* is determined by the current play position 504*a* (left boundary of the navigation interval on the seekbar 500) and the current play position plus the shifting limit value 506*a* (right boundary of the navigation interval on the seekbar 500). In this case, the navigation system is configured to ease a forward navigation only. In an implementation illustrated in FIG. 5B, the navigation interval 502*b* is determined by the current play position minus the shifting limit value 504*b* (left boundary of the navigation interval on the seekbar 500) and the current play position 506*b* (right boundary of the navigation interval on the seekbar 500). In that case, the navigation system is configured to ease a backward navigation only. In an implementation illustrated in FIG. 5C, the navigation interval 502*c* is determined by the current play position minus the shifting limit value 504*c* (left boundary of the navigation interval on the seekbar 500) and the current play position plus the shifting limit value 506c (right boundary of the navigation interval on the seekbar 500). In this case, the navigation system is configured to ease a backward and forward navigation. The navigation interval 502c is, in that implementation, centered on the current play position 508. That a navigation interval is for forward navigation, backward navigation, or both (irrespective of the shifting limit value as such) may vary between the selectable navigation settings displayed at step 406 (FIG. 4), such that one selectable navigation setting may be used to navigate forward only and another one backward only. In an implementation illustrated in FIG. 5D, each the navigation setting (or at least one) may be associated with a backward shifting limit value and a forward shifting limit value, such that the navigation interval 502d is determined by the current play position minus the backward shifting limit value 504d (left boundary of the navigation interval on the seekbar 500) and the current play position plus the forward shifting limit value 506d (right boundary of the navigation interval on the seekbar 500). Navigation interval 502d is thus not centered on the current play position 508. All these possibilities for the navigation settings allow the navigation content system to be more adaptable. The disclosed embodiments can be combined among the plurality of navigation settings.

FIGS. 6A, 6B, and 6C illustrate different configurations for the shifting limit values. These illustration are made using a seekbar 600 representing content with a beginning 602 and an end 604 and being displayed at a current play position 606. The shifting limit value may be a relative shifting limit value, determined by taking into account either the overall length of the content or the time elapsed or left to view. The shifting limit value may alternatively be an absolute shifting limit value, determined independently from the overall length of the content (e.g., predetermined and stored in the storage 310).

FIG. 6A illustrates two navigation settings 608a, 610a with their respective navigation intervals 612a, 614a determined by their respective shifting limit values. In this case, the two shifting limit values are absolute, which means that the spans of the navigation intervals 612a, 614a do not depend on the overall length of the content (i.e., the time between the beginning 602 and the end 604) or the time of content elapsed or left to watch (i.e., the time between the beginning 602 and the current play position 606, or the time between the current play position 606 and the end 604). Therefore, regardless of the current play position 606, the navigation intervals 612a, 614a will have the same spans. For example, the shifting limit value of navigation settings 608a may be 5 min, and the shifting limit value of navigation setting 610a may be 1 h. More generally, for a couple of navigation settings, one of the shifting limit values may be between 30 s and 5 min (e.g., 1 min) and one of the shifting limit values may be between 45 min and 1 h30 (e.g., 1 h).

FIGS. 6B and 6C illustrate two navigation settings 608b, 610b and 608c, 610c with their respective navigation intervals 612b, 614b and 612c, 614c determined by their respective shifting limit values. The two shifting limit values here are relative, which means that the spans of the navigation intervals 612b, 614b and 612c, 614c do depend on the overall length of the content or the time elapsed or left to view. In the embodiment of FIG. 6B, the shifting limit values may be determined as a fraction of the content left to view 616b, that is to say, the amount of content between the end 604 and the current play position 606. For example, the shifting limit value of navigation settings 608b may be 10% of the content left to view 616b, and the shifting limit value of navigation setting 610b may be 50% of the content left to view 616b (halfway through the content left to view). More generally, for a couple of navigation settings, one of the shifting limit values may be between 1% and 15% (e.g., 10%) of the content left to view 616b and one of the shifting limit values may be between 40% and 70% (e.g., 50%) of the content left to view 616B. In the embodiment of FIG. 6C, the shifting limit values may be determined using a fraction of the overall length of the content 616c and the current play position, such that the navigation interval is the amount between those two positions. For example, the fraction of the overall length of the content 616c may be 80% or the number of hours of the content (e.g., 2 h for a 2 h32 min-long content or 1 h for a 1 h08 min-long content), such that the navigation interval 612C or 614C is defined by the current play position on one boundary, and the 80% of the overall content or the number of hours of the content on the other boundary. In this embodiment, it is observable that the position of the boundary of the navigation interval that is not the current play position is independent from the current play position (because it is defined in relation to the overall length of the content only).

In FIGS. 6A, 6B, and 6C, the navigation intervals were determined as defined in relation to FIG. 5A only for conciseness reason (i.e., the navigation interval is between the current play position and the current play position plus the time shifting value). The navigation intervals can be also determined as defined in relation to FIGS. 5B, 5C, and 5D. In particular, in the implementation of FIG. 5D, for each navigation setting, the fraction associated with the forward shifting limit value and the backward shifting limit value may be identical (e.g., 50%) or different (e.g., 40% and 60%).

The embodiments to determine the navigation intervals (absolute or relative shifting limit value) may be combined among the plurality of navigation settings. For instance, one navigation setting of the plurality of selectable navigation settings may be associated with absolute shifting limit value as detailed above and another navigation setting of the plurality of selectable navigation setting may be associated with a relative shifting limit value as detailed above. In one particular implementation illustrated in FIG. 7, using a seekbar 700 at a current play position 702, the plurality of selectable navigation settings includes three navigation settings 704, 706, 708. A first navigation setting 704 is associated with an absolute shifting limit value that is between 30 s and 5 min (e.g., 1 min), a second navigation setting 706 is associated with an absolute shifting limit value that is between 30 min and 1 h30 min (e.g., 1 h), and a third navigation setting 708 is associated with a navigation interval whose boundary is the number of hours of the content (e.g., 1 h for any content whose overall length is between 1 h and 1 h59 min59 s, 2 h for any content whose overall length is between 2 h and 3 h59 min59 s, etc.). The respective navigation intervals are referenced 710, 712 and 714.

Figure 8:
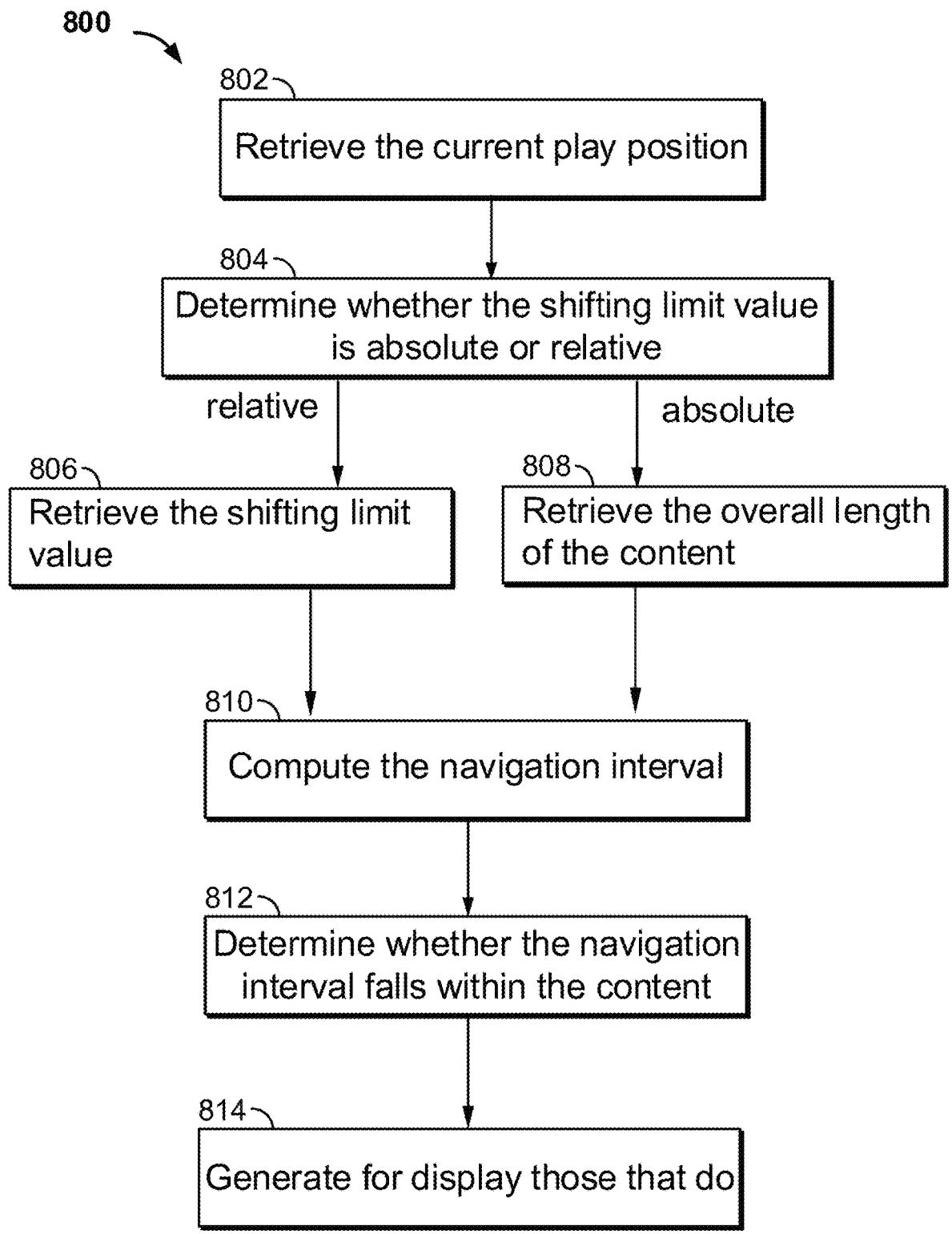
FIG. 8 is an illustrative flowchart of a process for computing the navigation interval, according to some embodiments of the disclosure.

FIG. 8 is an illustrative flowchart of a process 800 to determine the navigation interval, in accordance with some embodiments of the disclosure. Process 800 may be performed during step 406 of generating for display at least two navigation settings, or in response to step 404.

At step 802, control circuitry 304 retrieves the current play position and, at step 804, control circuitry 304 determines whether the navigation setting is associated with an absolute shift value or a relative shift value. Steps 802 and 804 can be run in parallel or in any order. In response to determining that the shifting limit value is absolute, control circuitry retrieves, at 806, the shifting limit value associated with the selected navigation setting (even though the selectable navigation settings are not yet displayed) and, at 810, computes the navigation intervals as disclosed in relation to FIG. 6A. In response to determining that the shifting limit value is relative, control circuitry retrieves, at 808, the overall length of the content and, at 810, computes the navigation intervals as disclosed in relation to FIGS. 6B and 6C.

When using absolute shifting limit values, it may happen that the navigation interval of a selectable navigation setting reaches the beginning or the end of the content and, thus, falls outside the content. As illustrated in the flowchart of FIG. 8, after having computed the navigation intervals, control circuitry 304 may, at 812, determine whether the respective computed navigation intervals of the navigation settings fall within the content, and at 814, control circuitry 304 generates for display only the navigation settings for which the navigation intervals fall within the content. Step 814 may therefore correspond to step 406 in an embodiment. For instance, the content navigation system may have, in the storage 310, a plurality of navigation setting configurations and display a selection of two or three of them that fall within the content.

In an embodiment, to further ease the navigation, control circuitry 304 may utilize a scaling parameter, the scaling parameter being the link between the navigation amount (of step 410) and the navigation amount time within the navigation interval (i.e., the amount of content that is being shifted based on the navigation amount). For instance, assuming that the navigation amount is a distance D, for instance the length of a path drawn by a finger on the user interface 316, and that the navigation amount time T within the content is proportional to the distance D, then D and T can be expressed as: T=k.D, where k is the scaling parameter (only positive numbers are considered here). For a same distance D, the higher k is, the higher T is.

Figure 9A:
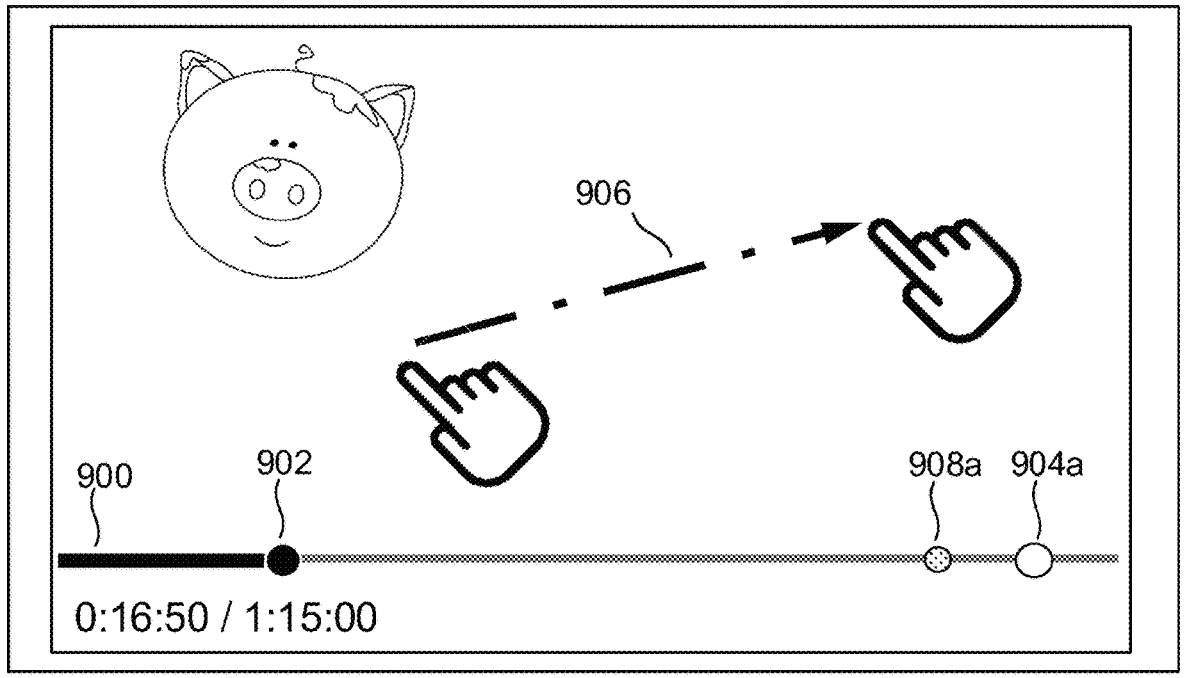
FIGS. 9A and 9B are illustrative diagrams of two different scaling parameters, according to some embodiments of the disclosure.
Figure 9B:
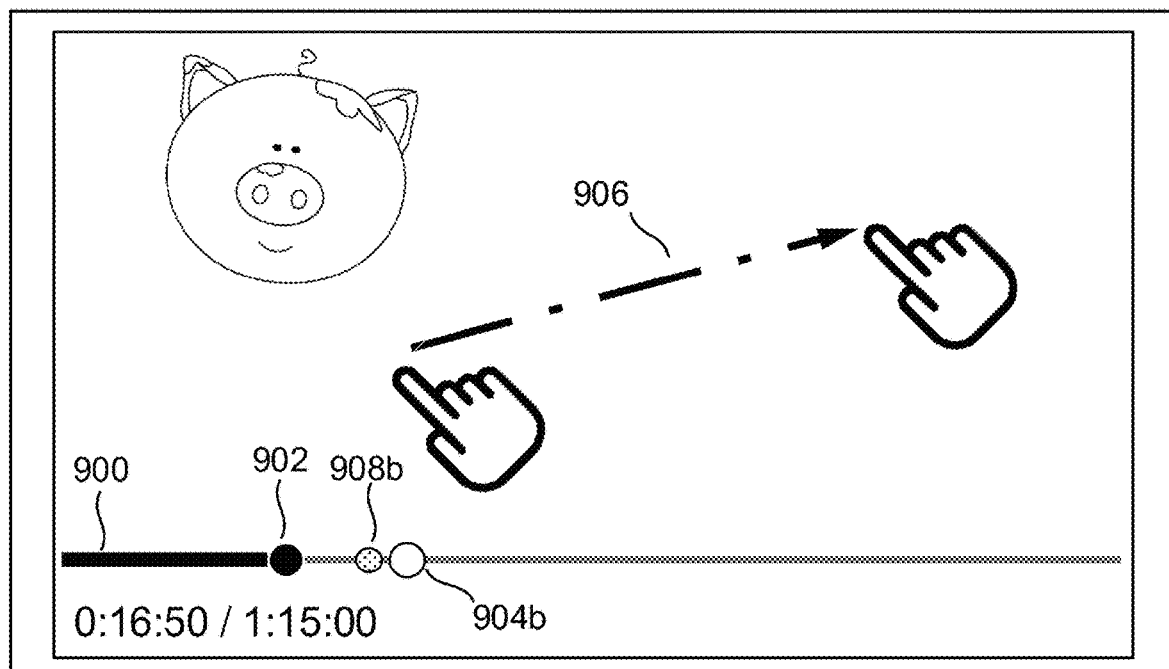

FIGS. 9A and 9B illustrate, using a seekbar 900 and a current play position 902, two situations where the scaling parameters are different. In FIGS. 9A and 9B, the navigation intervals, respectively represented by the boundaries 902 and 904a, 902 and 904b, do not have the same length (much longer in FIG. 9A than in FIG. 9B). However, to be able to navigate easily, it is preferable that the movement associated with an input of a navigation amount 906 be easily doable by a user. Typically, the input may include a path on the content interface display representing a navigation amount 906. As such, the navigation amount 906 may be physically limited (e.g., the maximum dimension of the content interface display, which is usually the height or the width of the display of the user device) or reasonably limited by the effort that the user is ready to put into the navigation process. Therefore, to be able to navigate throughout the whole navigation intervals of FIGS. 9A and 9B, while keeping some precision in the shifted position, the scaling parameter needs to be adapted to the span of the navigation interval. In FIG. 9A, the navigation interval has a length of approximately 1 h and in FIG. 9B, the navigation interval has a length of approximately 10 min. In both FIGS. 9A and 9B, the navigation amount is around 4 cm. To be able to navigate throughout the navigation interval of FIG. 9A with the navigation amount 906, the scaling parameter needs to be big (at around 15 min/cm), while to be able to navigate finely throughout the navigation interval of FIG. 9B with the same navigation amount 906, the scaling parameter needs to be small (at around 3 min/cm). Therefore, for a same navigation amount 906, the shifted position 908a in FIG. 9A is farther away from the current play position than the shifted position 908b in FIG. 9B.

Figure 10:
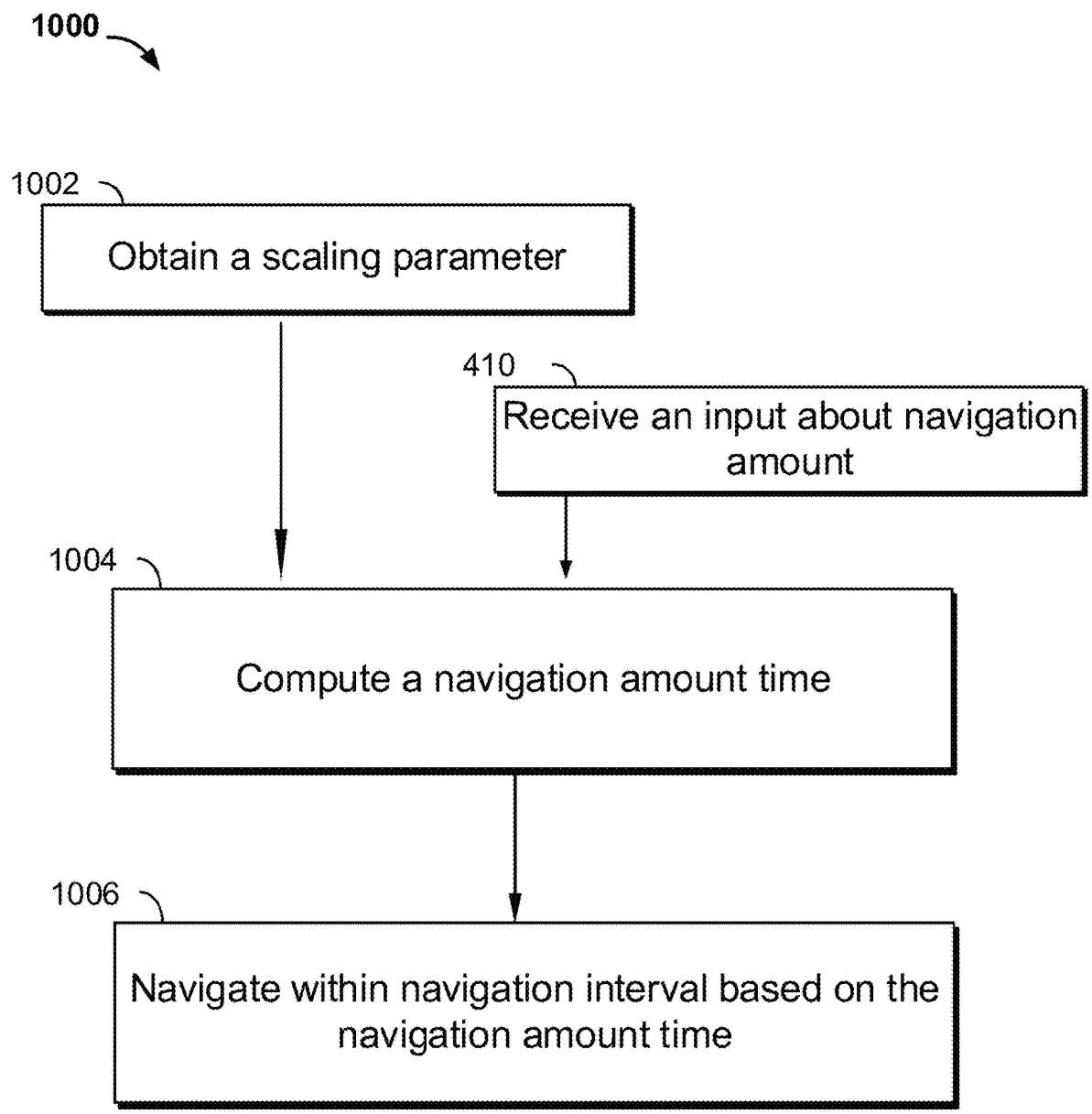
FIG. 10 is an illustrative flowchart of a process for computing a navigation amount time using a scaling parameter, according to some embodiments of the disclosure.

FIG. 10 is an illustrative flowchart of a process 1000 taking into account a scaling parameter. At step 1002, control circuitry 304 obtains a scaling parameter. Step 1002 can be performed anytime between steps 404 and 412. Then, using the navigation amount of step 410 and the scaling parameter, control circuitry 304 computes, at 1004, the navigation amount time and, at 1006, navigates within the navigation interval based on the navigation amount time.

In an embodiment, the scaling parameter is part of the navigation settings, such that each navigation setting is associated with a shifting limit value and a scaling parameter. Therefore, obtaining a scaling parameter 1002 may be based on the selection of the navigation settings, at 408.

To improve the navigation, the scaling parameters of the plurality of navigation settings are different from one another and are chosen to be relevant for the navigation interval of their respective navigation setting. As explained above, for instance, a navigation interval of 1 min may need a small scaling parameter, so that the user can finely adjust the shifted position using a substantial portion of the content display interface. Conversely, a navigation interval of 2 h may need a high scaling parameter, so that the user may easily adjust the shifted position using the same substantial portion of the content display interface.

To get the most appropriate scaling parameter, control circuitry 304 may compute the scaling parameter as follows: span of the navigation interval divided by a dimension of the content display interface (e.g., the height, the width, or the diagonal of the display of the user device). A scaling parameter computed this way is therefore defined as a function of the navigation interval associated with a setting parameter, and thus, is appropriate to easily navigate throughout the navigation interval. For instance, if a user selects a navigation setting generating a navigation interval of one minute after the current play position in a content that is 3 h, the user can take advantage of the whole display of his or her device to finely navigate within that minute, instead of struggling to move the play position on the seekbar as little as possible (which, in that situation, might already be too much given the length of the content) per the existing techniques. In this regard, control circuitry 304 may compute the scaling parameter after step 404 if the current play position is needed. For instance, the control circuitry 304 may compute the scaling parameter after reception of the input indicating a selection, at step 408.

In addition, control circuitry 304 may display, on the content display interface, an option for the user to voluntarily change the scaling parameter. Upon input from a user, control circuitry 304 may then compute the navigation amount time using the voluntarily changed scaling parameter.

Figure 11A:
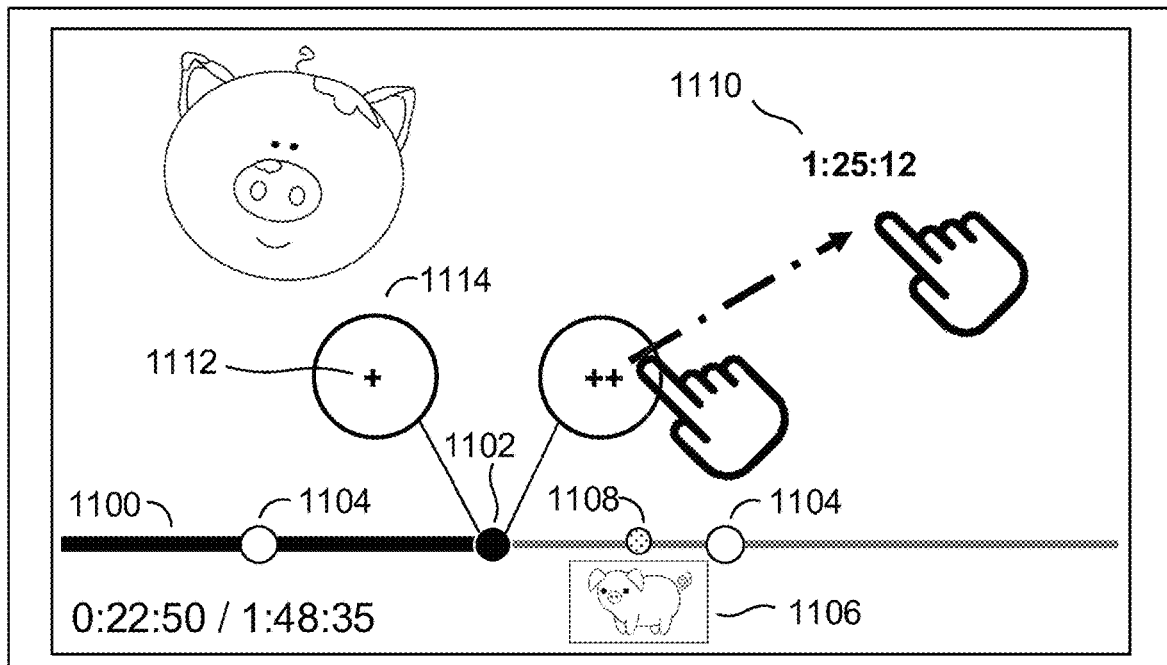
FIGS. 11A and 11B are illustrative diagrams representing visual markers to assist the user, according to some embodiments of the disclosure.
Figure 11B:
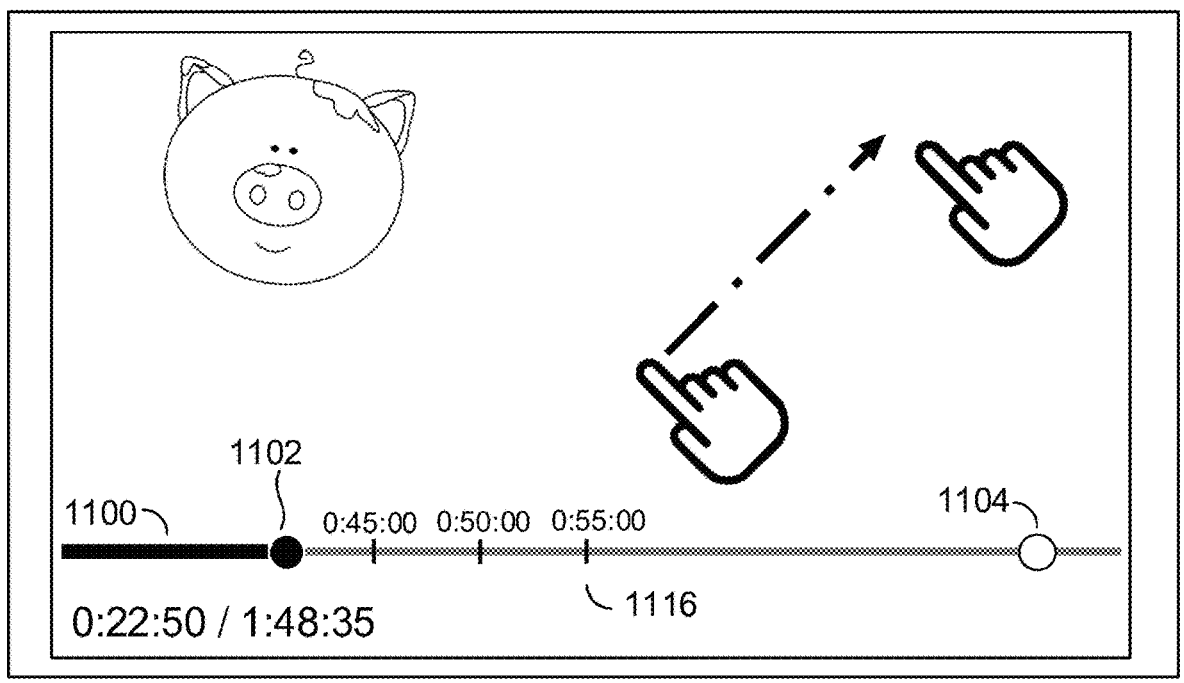

To assist the user in navigating within the content, the navigation system may display different types of visual markers on the content display interface (or the display of the user device). FIGS. 11A and 11B illustrates different visual markers, using a seekbar 1100 and current play position 1102.

In an embodiment illustrated in FIGS. 11A and 11B, a visual marker may represent each navigation interval, for instance by showing the boundaries 1104 (only one navigation interval represented in FIG. 11A). Control circuitry 304 may generate for display that visual marker at the same time it generates for display the selectable navigation settings. After step 410 of reception of an input indicating a selection of a navigation setting, only the visual marker associated with navigation interval of the selected navigation setting may be displayed.

In another embodiment illustrated in FIG. 11A, a visual marker may be a thumbnail 1106 (or preview window) representing the (or of the) content at the shifted position 1108 or may be a marker 1108 (the same reference of 1108 is used here to designate both the shifted position and its visual indication on the content display interface) of the expected shifted position. The thumbnail and/or the marker of the expected shifted position may appear only at the end of the input of the navigation amount or, preferably, while the user is currently inputting the navigation amount, so that he or she gets a real-time preview of the content. Preferably, the thumbnail is in the vicinity of the seekbar. Control circuitry 304 may generate for display that visual marker at the same time it is receiving the input of the navigation amount.

In an embodiment illustrated in FIG. 11A, a visual marker may be an elapsed time indication 1110 of the shifted position in the content, for instance in the form of a sequence "h:min:s" corresponding to the time position of the shifted position in the content (e.g., "1 h25 min12 s" as illustrated in FIG. 11A, while the current play position may be, for instance, "0 h53 min22 s"). The time indication may appear only at the end of the input of the navigation amount or while the user is currently inputting the navigation amount, so that he or she gets a real-time time indication of the shifted position. Preferably, the time indication is in the vicinity of the input on the content display interface (e.g., where the finger is). Control circuitry 304 may generate for display that visual marker at the same time it is receiving the input of the navigation amount.

In an embodiment illustrated in FIG. 11A, a visual marker may be a setting marker 1112 of a selectable navigation setting 1114. The setting marker 1112 provides some information to the user about the selectable navigation setting 1114: it may be an alphanumeric character or series of characters, or an illustration. In one implementation, each navigation setting 1114 has its own setting marker 1112, and they are different from one another. For instance, the setting marker 1112 differentiates based on the length of the associated navigation interval (illustrated by boundaries 1104). An example of different of setting markers is provided in FIG. 7, where "Sec", "Min" and "Hour" indicate to the user an order of magnitude of the navigation authorized by the associated navigation setting. Setting marker 1114 may appear and disappear on the content display interface at the same time that the selectable navigation setting may appear and disappear. Control circuitry 304 may thus generate for display that visual marker at the same time control circuitry 304 is generating for display the selectable navigation settings. In addition, each selectable navigation setting, when generated for display, may comprise a visual button overlaid on the content, with transparency or not (e.g., the circles in FIGS. 1, 2, 6A, 6B, 6C, 7, 11A), on which the user may click to provide the input defined in step 408.

In an embodiment illustrated in FIG. 11B, a visual marker may include temporal markers representing different temporal positions 1116 within the content (or more specifically within the navigation interval) represented by the seekbar. The time indications 1116 may mark every 10 s, 30 s, 1 min, 5 min, 15 min, 30 min, or 1 h, for instance (or any other value at regular intervals). The temporal positions 1116 may appear during the input of the navigation amount or at the same time as the generation for display of the navigation settings, at step 406.

Figure 12:
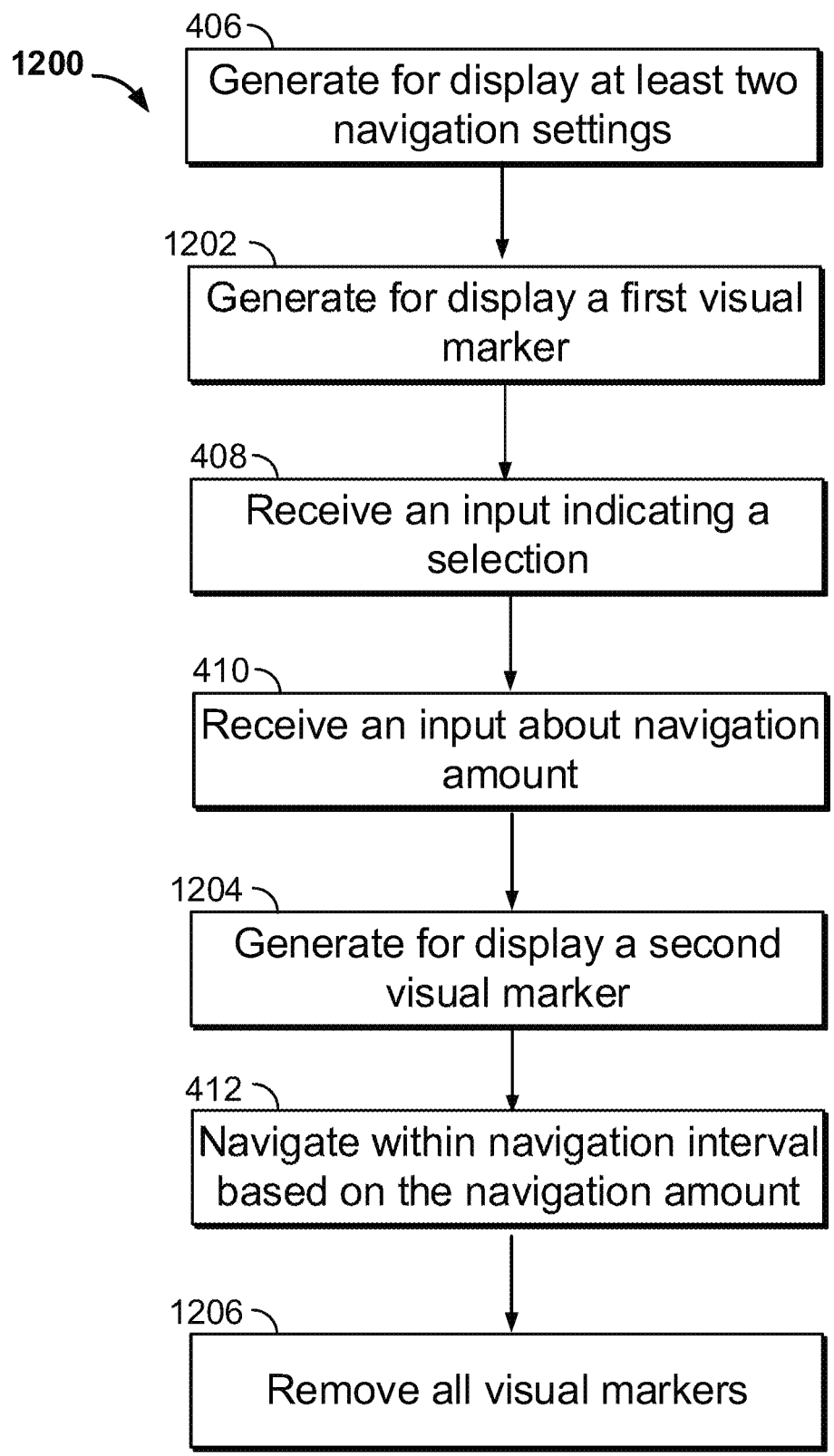
FIG. 12 is an illustrative flowchart of a process for generating for display the visual markers, according to some embodiments of the disclosure.

FIG. 12 is an illustrative flowchart of a process 1200 displaying visual markers. After step 406 (or at the same time) and before step 408, control circuitry 304 may generate for display, at 1202, a first visual marker. The first visual marker may be the setting marker 1112, the boundaries 1104 and/or the temporal position 1116. During or after step 410 (reception of input about the navigation amount), control circuitry 304 may generate for display, at 1204, a second visual marker. The second visual marker may be the thumbnail 1106, the marker 1108, or the time indication 1110, for instance in addition to the first visual marker. Once the navigation to the shifted position is done, at 412, control circuitry 304 may, at 1206, remove all the visual markers from the content display interface (including the seekbar or any other information displayed).

Figure 13:
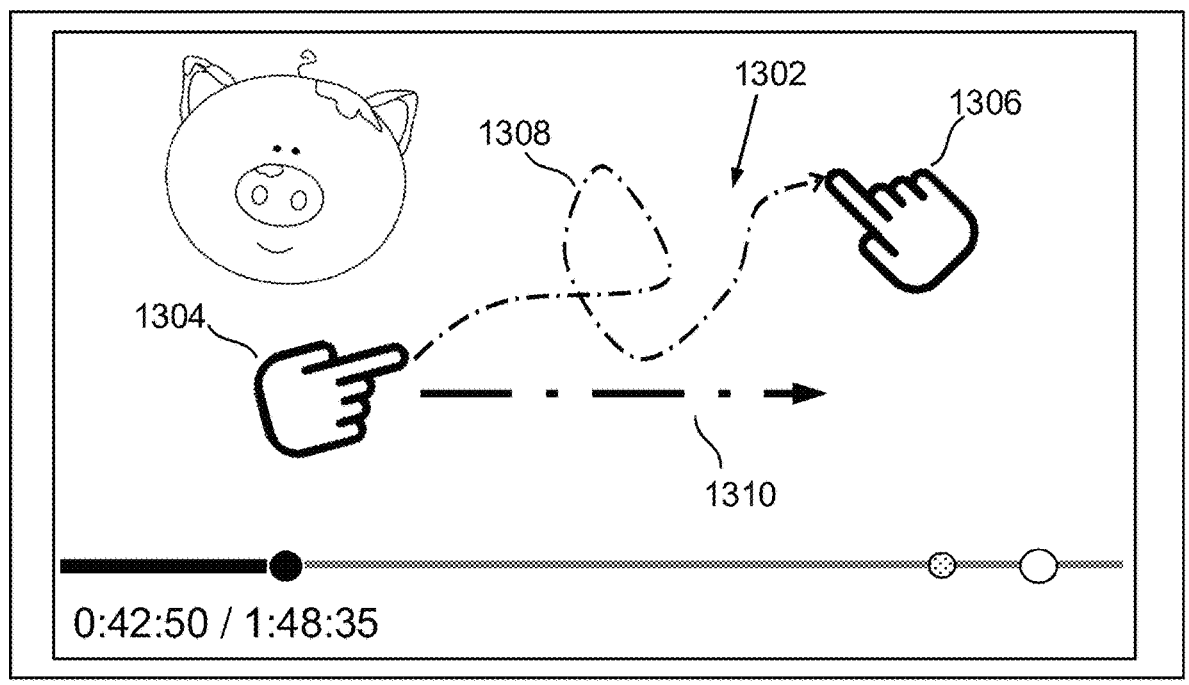
FIG. 13 is an illustrative diagram of 2-dimensional path relating to the navigation amount, according to some embodiments of the disclosure.

As illustrated in FIGS. 2, 9A and 9B, and 13, the navigation amount may comprise a path within the content display interface. The navigation amount is typically determined using a path on the content display interface, via the user interface 316. For instance, in FIG. 13, a path 1302 starts with the detection of a physical touching 1304 of the content display interface and terminates with the detection of a release 1306 of the physical touching of the content display interface. The physical touching may be performed by a finger or a stylus. The path may be essentially 1-dimensional, as illustrated in FIGS. 2, 9A and 9B (even though a user cannot usually perform a perfectly straight line and the path will inherently be 2-dimensional), or 2-dimensional, as illustrated in FIG. 13.

To convert the path into a navigation amount that can be used by the content navigation system, a length of the path may be computed. In one embodiment, the navigation amount is the overall length of the path. When the path is a 2-dimensional path, a 2-dimensional grid may be used to compute the length of the path. Using a 2-dimensional path, the length of the path may include at least one loop 1308 to increase its length (e.g., a finger going 3 cm to the right then 1 cm to the left means the path has a length of 4 cm). Therefore, the user might not need to use a whole dimension of the content display interface to input the path, but can easily do it on a small, localized portion of the content display interface, doing loops or similar shapes. In one embodiment, the navigation amount is the length of the path going in one direction, such as left and right (e.g., a finger going 3 cm to the right then 1 cm to the left means the path has a length of 2 cm to the right and not a length of 4 cm). This allows movement forward and backward based on the direction of the path. In this case, the loop would have a null effect (or close to null) on the length of the path. In one embodiment, the navigation amount is the length of a 1-dimensional projection 1310 of the 2-dimensional path (e.g., a projection orthogonal to the seekbar or parallel with the seekbar). In one embodiment, the navigation amount is the length of the projection of the path based on the direction of the path, such as left and right (e.g., a projection, of a path, going 3 cm to the right then 1 cm to the left means the projection of the path has a length of 2 cm to the right).

Figure 14:
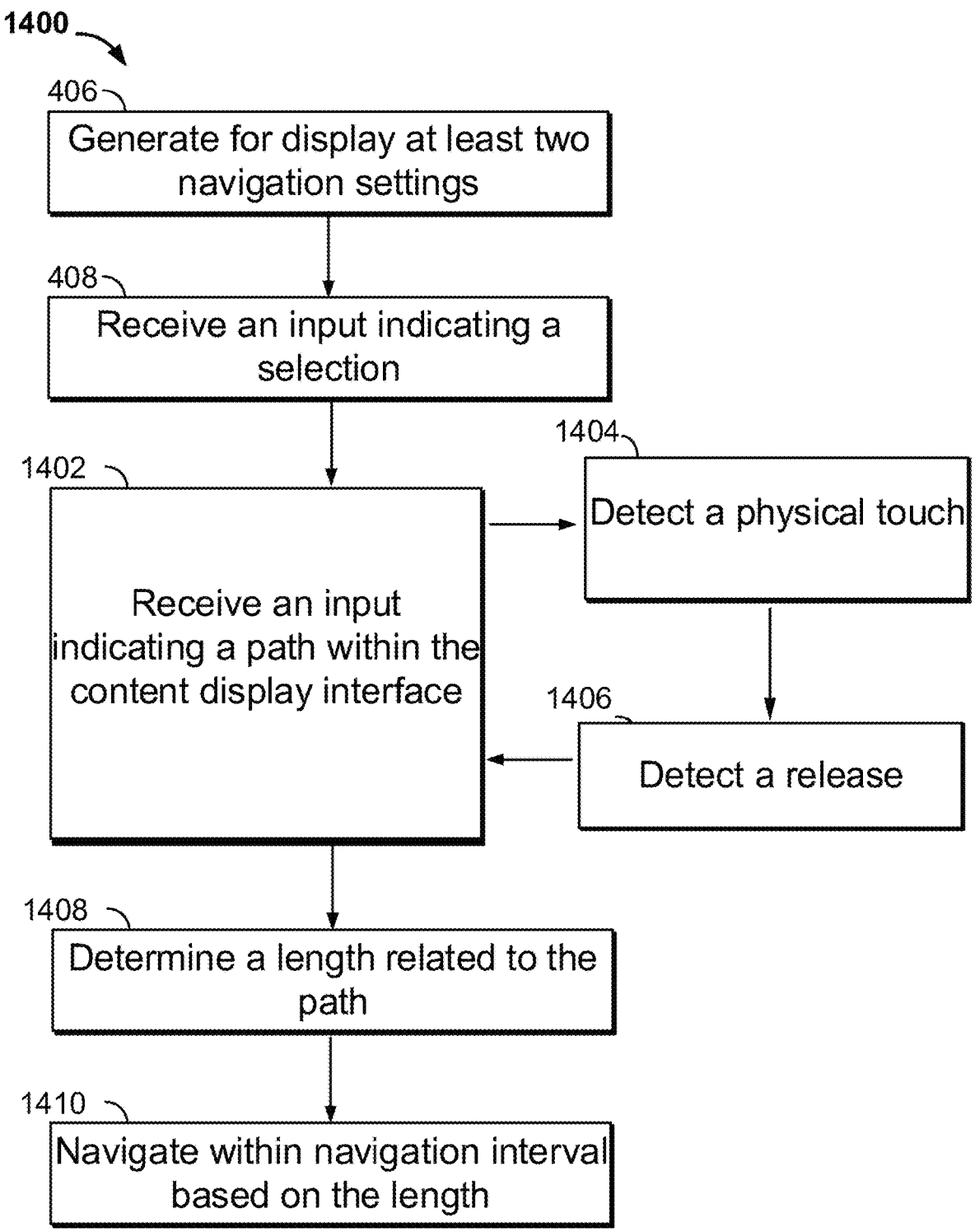
FIG. 14 is an illustrative flowchart of a process for navigating within the navigation interval using a path, according to some embodiments of the disclosure.

FIG. 14 is an illustrative flowchart of a process 1400 where the navigation amount is determined based on a path on the content display interface. After step 408, control circuitry 304 may receive, at 1402, an input indicating a path within the content display interface. Step 1402 may comprise detecting, at 1404, a physical touching of the content display interface and detecting, at 1406, the release of the physical touching to terminate the path. In one implementation, the detection, at step 1404, is the reception of the input indicating a selection of a navigation setting, at step 408, so that the user chooses the navigation setting, and, during the same movement of the hand or finger, proceeds with the path, determining the navigation amount. At 1408, control circuitry 304 determines a length associated with the path. As described above, the length may be the overall length of the path, a portion of the overall length of the path, or the length of a projection of the path. Finally, at 1410, corresponding to step 412, control circuitry 304 navigates within the navigation interval based on the determined length. This is typically performed using the scaling parameter disclosed previously to link the path length (i.e., the navigation amount) with the navigation amount time.

In a further embodiment, control circuitry 304 may determine a forward or backward direction for the content navigation operation. The detection may occur while receiving an input indicating a selection of a navigation setting, at 408, or may be independent. In one implementation, the determination may be based on detecting an initial forward or reverse navigation motion within the content display interface, for instance, just after detection of the physical touching, at 1404, using the direction of the beginning of the path.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for navigating content, the method comprising:
    generating for display, on a content display interface, a seekbar, wherein the seekbar indicates a current play position of the content;
    receiving a first input to perform a content navigation operation;
    in response to receiving the first input, generating for display, on the content display interface, at least two selectable navigation settings, wherein each of the at least two selectable navigation settings is associated with one of at least two shifting limit values that determines, in combination with the current play position, a navigation interval within the content, each of the at least two shifting limit values of the at least two selectable navigation settings being different from one another, wherein a first navigation setting of the at least two selectable navigation settings permits navigation in seconds and a second navigation setting of the at least two selectable navigation settings permits navigation in minutes, wherein the first navigation setting is positioned in a first portion of the content display interface located behind an indicator representing the current play position on the seekbar and the second navigation setting is positioned in a second portion of the content display interface located in front of the indicator representing the current play position on the seekbar, and wherein each of the first navigation setting and the second navigation setting includes a first shifting limit which is an absolute shift limit and a second shifting limit which is a relative shift limit;
    receiving a second input indicating a selection of one of the at least two selectable navigation settings, the at least two selectable navigation settings including the first shifting limit and the second shifting limit, wherein the first shifting limit is based upon an overall length of the content;
    receiving a third input, via the seekbar, indicating a navigation amount within the content display interface, the navigation amount being relative to the first shifting limit or the second shifting limit; and
    navigating from the current play position to a shifted play position within the navigation interval based on the selection of the one of the at least two selectable navigation settings and the navigation amount.

2. The method of claim 1, further comprising utilizing a scaling parameter, the scaling parameter translating the navigation amount to a navigation amount time, wherein navigating from the current play position to the shifted play position is further based on the scaling parameter.

3. The method of claim 2, wherein each of the at least two selectable navigation settings is associated with a corresponding scaling parameter, and utilizing the scaling parameter is based on the selection of one of the at least two selectable navigation settings.

4. The method of claim 1, wherein the navigation interval is determined by:
    the current play position and the current play position plus the one of the at least two shifting limit values; or
    the current play position minus the one of the at least two shifting limit values and the current play position plus the one of the at least two shifting limit values; or
    the current play position minus the one of the at least two shifting limit values and the current play position.

5. The method of claim 1, wherein at least one of the at least two shifting limit values is determined based on a predetermined absolute value, or on an amount of content left to view or on the overall length of the content.

6. The method of claim 1, further comprising:
    displaying on the content display interface at least one of:
    an interval marker representing the navigation interval;
    a preview window representing the content at the shifted play position;
    an elapsed time indication of the shifted play position;
    temporal markers indicating positions within the content represented by the seekbar; or
    a marker representing an expected shift position during the receiving of the third input indicating the navigation amount.

7. The method of claim 6, wherein the preview window is displayed on the seekbar and/or a time value of the shifted play position is displayed in a vicinity of the third input indicating the navigation amount.

8. The method of claim 1, wherein the third input indicating the navigation amount includes a physical path within the content display interface.

9. The method of claim 8, wherein the physical path is based on detecting a physical touching, sliding along, and release from the content display interface, and wherein the detecting of the physical touching is the receiving of the second input indicating the selection of one of the at least two selectable navigation settings.

10. A system for navigating content, the system comprising:
    control circuitry configured to:
    generate for display, on a content display interface, a seekbar, wherein the seekbar indicates a current play position of the content;

receive a first input to perform a content navigation operation;

in response to receiving the first input, generate for display, on the content display interface, at least two selectable navigation settings, wherein each of the at least two selectable navigation settings is associated with one of at least two shifting limit values that determines, in combination with the current play position, a navigation interval within the content, each of the at least two shifting limit values of the at least two selectable navigation settings being different from one another, wherein a first navigation setting of the at least two selectable navigation settings permits navigation in seconds and a second navigation setting of the at least two selectable navigation settings permits navigation in minutes, wherein the first navigation setting is positioned in a first portion of the content display interface located behind an indicator representing the current play position on the seekbar and the second navigation setting is positioned in a second portion of the content display interface located in front of the indicator representing the current play position on the seekbar, and wherein each of the first navigation setting and the second navigation setting includes a first shifting limit which is an absolute shift limit and a second shifting limit which is a relative shift limit;

receive a second input indicating a selection of one of the at least two selectable navigation settings, the at least two selectable navigation settings including the first shifting limit and the second shifting limit, wherein the first shifting limit is based upon an overall length of the content;

receive a third input, via the seekbar, indicating a navigation amount within the content display interface, the navigation amount being relative to the first shifting limit or the second shifting limit; and navigate from the current play position to a shifted play position within the navigation interval based on the selection of the one of the at least two selectable navigation settings and the navigation amount.

11. The system of claim 10, wherein the control circuitry is further configured to:

utilize a scaling parameter, the scaling parameter translating the navigation amount to a navigation amount time;

wherein navigating from the current play position to the shifted play position is further based on the scaling parameter.

12. The system of claim 11, wherein each of the at least two selectable navigation settings is associated with a corresponding scaling parameter, and utilizing the scaling parameter is based on the selection of one of the at least two selectable navigation settings.

13. The system of claim 10, wherein the navigation interval is determined by:

the current play position and the current play position plus the one of the at least two shifting limit values;

the current play position minus the one of the at least two shifting limit values and the current play position plus the one of the at least two shifting limit values; or the current play position minus the one of the at least two shifting limit values and the current play position.

14. The system of claim 10, wherein at least one of the at least two shifting limit values is determined based on a predetermined absolute value, or on an amount of content left to view or on the overall length of the content.

15. The system of claim 10, wherein the control circuitry is further configured to:

display on the content display interface at least one visual marker including at least one of:

an interval marker representing the navigation interval;

a preview window representing the content at the shifted play position;

an elapsed time indication of the shifted play position;

temporal markers indicating positions within the content represented by the seekbar; or a marker representing an expected shift position during the receiving of the third input indicating the navigation amount.

16. The system of claim 15, wherein the preview window is displayed on the seekbar and/or a time value of the shifted play position is displayed in a vicinity of the third input indicating the navigation amount.

17. The system of claim 10, wherein the third input indicating the navigation amount includes a physical path within the content display interface.

18. The system of claim 17, wherein the physical path is based on detecting a physical touching, sliding along and release from the content display interface and wherein the detecting of the physical touching is the receiving of the second input indicating the selection of one of the at least two selectable navigation settings.

* * * * *